United States Patent Office 2,992,231
Patented July 11, 1961

2,992,231
PYRROLIDYL DERIVATIVES OF 3-ARYLINDENES AND 3-ARYLINDANES
Kenneth N. Campbell, Evansville, Ind., Donald E. Rivard, Haddonfield, N.J., and Rolland F. Feldkamp, Evansville, Ind., assignors to Mead Johnson & Company, Evansville, Ind., a corporation of Indiana
No Drawing. Filed Apr. 15, 1959, Ser. No. 806,463
12 Claims. (Cl. 260—313)

This invention relates to new pyrrolidylmethyl substituted aryl indenes and indanes and more specifically to a class of compounds represented by the 1-(1-substituted-3-pyrrolidylmethyl)-3-arylindenes and 1-(1-substituted-3-pyrrolidylmethyl)-3-arylindanes. The nontoxic, physiologically and therapeutically acceptable acid addition and quaternary ammonium salts of these compounds are also contemplated as part of the present invention. These new compounds have the following structure $$Z-CH_2-CH-CH_2$$
$$\phantom{Z-CH_2-}\underset{\underset{R_1}{N}}{CH_2\phantom{-}CH_2}$$

wherein $R_1$ is a radical selected from the group consisting of lower alkyl and lower alkenyl, such as methyl, ethyl, propyl, butyl, allyl, butenyl and the like, and Z is a radical selected from the group consisting of

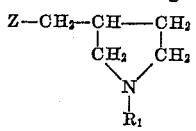

and wherein Ar is an aryl radical selected from the group consisting of phenyl and alkoxy phenyl, such as methoxyphenyl, ethoxyphenyl and the like, and $R_2$ is hydrogen or a lower alkyl radical, such as methyl, ethyl, propyl and the like.

The compounds of the present invention are useful as antispasmodic agents to control muscle spasms by antagonizing normal contractile states of intestinal, ureteral, uterine and bronchial smooth muscle in animals. These compounds may be administered orally in tablets, capsules, elixirs, syrups, or emulsions. A dosage of from 0.2 to 2.0 milligrams per kilogram of body weight taken as indicated for the relief of muscle spasms is usually adequate.

The compositions of the present invention may be prepared from the 3-arylindenes. These intermediates may be prepared by the reaction of the appropriate phenyl Grignard reagent with 1-indanone according to the general method of Mayer and Sieglitz Ber. 54, 1397 (1921). 1-indanone may be prepared by the polyphosphoric acid catalyzed ring closure of hydrocinnamic acid as described by Koo, J.A.C.S. 75, 1891 (1953).

The 3-arylindenes are converted to the 1-(1-substituted-3-pyrrolidylmethyl)-3-arylindenes by treatment with sodamide, or equivalent, to form the sodium salt of the 3-arylindene followed by reaction with an N-substituted-3-pyrrolidylmethyl halide (prepared as disclosed in U.S. Patent No. 2,826,588, dated March 11, 1958) in accordance with the following equation:

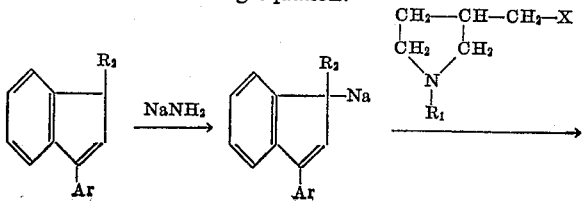

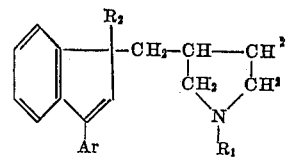

In the above equation the radicals identified as Ar, $R_1$ and $R_2$ are as disclosed above. X represents a halogen, such as chlorine or bromine. The N-substituted 3-pyrrolidylmethyl halides, suitable as starting materials, are disclosed in the above mentioned United States patent. It is preferred in this step of the synthesis to use approximately equimolar amounts of the sodamide, the N-substituted-3-pyrrolidylmethyl halide and the 3-arylindene since an excess of the first named reactant may result in appreciable formation of by-products and consequent reduction in yield. Of course, since sodamide is reactive with water, precautions to maintain substantially anhydrous conditions are required. The corresponding indane derivatives are prepared by hydrogenation of the indene compound. The hydrogenation may be carried out with conventional techniques using hydrogen under pressure and a catalyst, such as palladium or platinum black or Raney nickel.

The preparation of exemplary 3-arylindenes is disclosed in the copending application of Kenneth N. Campbell, Serial No. 626,308, filed Dec. 5, 1956, now Patent No. 2,884,456, issued April 28, 1959.

EXAMPLE 1

*1-(1-methyl-3-pyrrolidylmethyl)-3-phenylindene*

A mixture of 32.8 grams (0.17 mole) of 3-phenylindene and 3.9 grams (0.1 mole) of sodamide in 300 milliliters of anhydrous benzene was stirred and refluxed for 45 minutes. A solution of 16.1 grams (0.12 mole) of 1-methyl-3-pyrrolidylmethyl chloride in 100 milliliters of dry benzene was added dropwise during one hour, and the mixture was then stirred and refluxed for twelve hours. The reaction mixture was poured onto crushed ice, the benzene layer separated and the aqueous layer extracted with ether. The combined benzene and ether solutions were dried over magnesium sulfate, the solvents were removed under reduced pressure and the residue was distilled in vacuo. There was obtained 10.5 grams (36%) of 1-(1-methyl-3-pyrrolidylmethyl)-3-phenylindene, boiling point 162–166°/0.45 mm., $n_D^{20}$ 1.5952.

*Analysis.*—Calcd. for $C_{21}H_{23}N$: C, 87.15; H, 8.01. Found: C, 87.21; H, 7.77.

Instead of sodamide, it is possible to use sodium hydride, lithium amide or butyl lithium to form an alkali metal salt of the 3-arylindene suitable for reaction with an N-substituted-3-pyrrolidylmethyl halide. Since these latter compounds can be prepared as the hydrohalide salt, it is possible to use these salts directly, by using two molar equivalents of sodamide, lithium amide, sodium hydride or butyl lithium. In this way isolation of the free base can be avoided.

EXAMPLE 2

*Preparation of 1-(1-methyl-3-pyrrolidylmethyl)-3-phenylindane*

A solution of 10.4 grams (0.036 mole) of 1-(1-methyl-3-pyrrolidylmethyl)-3-phenylindene in 150 milliliters of 95% ethanol containing 350 milligrams of Baker's 10% palladium on carbon catalyst was shaken with hydrogen at an initial pressure of 60 p.s.i., and at room temperature until absorption of hydrogen ceased (3–4 hours). The catalyst was removed by filtration, and the filtrate was evaporated under reduced pressure to remove the ethanol. The residue was taken up in ether, washed with water, dried over magnesium sulfate, and distilled. There was obtained 6.4 grams (61%) of 1-(1-methyl-3-pyrrolidylmethyl)-3-phenylindane, boiling point 152–156°/ 0.4 mm., $n_D^{20}$ 1.5764.

*Analysis.*—Calcd. for $C_{21}H_{25}N$: C, 86.55; H, 8.65; N, 4.81. Found: C, 86.80; H, 8.40; N, 4.96.

EXAMPLE 3

*1-(1-ethyl-3-pyrrolidylmethyl)-3-phenylindene*

A mixture of 115.2 grams (0.6 mole) of 3-phenylindene, 16.8 grams (0.43 mole) of sodamide, and 600 ml. of dry benzene was refluxed gently for 45 minutes. To the refluxing solution was then added 59 grams (0.4 mole) of 1-ethyl-3-pyrrolidylmethyl chloride in 200 ml. of dry benzene. Reflux was continued after the addition for 9 hours, and the reaction allowed to stand overnight. The reaction mixture was decomposed over ice and the organic layer was separated and extracted with dilute hydrochloric acid. From the dried organic layer was recovered 57 grams of unreacted 3-phenylindene. The aqueous acid solution was made basic and the freed base was extracted with ether. After drying the ether extract, the solvent was removed and the residue was distilled. The fraction boiling, 161–165°/0.2, was collected, 49.6 grams, $n_D^{20}$ 1.5866 (40% yield based on aminochloride used).

*Analysis.*—Calcd. for $C_{22}H_{25}N$: N, 4.62. Found: N, 4.61.

EXAMPLE 4

*1-(1-n-propyl-3-pyrrolidylmethyl)-3-phenylindene*

This compound was prepared in the same manner as Example 3, utilizing however the 1-n-propyl-3-pyrrolidylmethyl chloride in place of the 1-ethyl-3-pyrrolidylmethyl chloride reactant. The resulting product had the following physical properties: Boiling point 166–172° C. at 0.13 mm., and refractive index $n_D^{20}$ 1.5805.

*Analysis.*—Calcd. C, 87.02; H, 8.57; N, 4.41. Found: C, 86.86; H, 8.34; N, 4.84.

EXAMPLE 5

*1-(1-isopropyl-3-pyrrolidylmethyl)-3-phenylindene*

This compound was prepared in the same manner as Example 3, utilizing however the 1-isopropyl-3-pyrrolidylmethyl chloride in place of the 1-ethyl-3-pyrrolidylmethyl chloride reactant. The resulting product had the following physical properties: Boiling point 164–168° C./0.13 mm. and refractive index $n_D^{20}$ 1.5834.

*Analysis.*—Calcd. N, 4.41. Found: N, 4.33.

EXAMPLE 6

*1-(1-n-butyl-3-pyrrolidylmethyl)3-phenylindene*

This compound was prepared in the same manner as Example 3, utilizing however the 1-n-butyl-3-pyrrolidylmethyl chloride in place of the 1-ethyl-3-pyrrolidylmethyl chloride reactant. The resulting product had the following physical properties: Boiling point 172–178° C./0.35 mm. and refractive index $n_D^{20}$ 1.5763.

*Analysis.*—Calcd. C, 86.96; H, 8.82; N, 4.23. Found: C, 86.92; H, 8.39; N, 4.59.

EXAMPLE 7

*1-(1-allyl-3-pyrrolidylmethyl)-3-phenylindene*

This compound was prepared in the same manner as Example 3, utilizing however the 1-allyl-3-pyrrolidylmethyl chloride in place of the 1-ethyl-3-pyrrolidylmethyl chloride reactant. The resulting product had the following physical properties: Boiling point 158–160° C./0.05 mm. and refractive index $n_D^{20}$ 1.5900.

*Analysis.*—Calcd. C, 87.57; H, 7.99; N, 4.44. Found: C, 87.75; H, 7.67; N, 4.77.

EXAMPLE 8

*1-(1-ethyl-3-pyrrolidylmethyl)-3-phenylindane*

In 75 ml. of 95% ethanol were mixed 21.4 grams (0.07 mole) of 1-(1-ethyl-3-pyrrolidylmethyl)-3-phenylindene of Example 4, and 1.0 gram of 10% palladium on carbon, and the mixture was reduced in three hours on a Parr hydrogenator. After reduction, the catalyst was removed by filtration and the alcohol was removed from the filtrate. The residue was taken up in ether, washed with water, dried with magnesium sulfate, and distilled. The fraction boiling at 165°/0.13 mm. was collected, $n_D^{20}$ 1.5704.

*Analysis.*—Calcd. for $C_{22}H_{27}N$: C, 86.50; H, 89.1; N, 4.59. Found: C, 86.20; H, 8.89; N, 4.74.

EXAMPLE 9

The corresponding indanes of the indenes prepared in Examples 4, 5 and 6 were prepared by hydrogenation as described in Example 8. The resulting compounds had the following properties:

| Indane of Example | B.P., °C./ mm. | $n_D^{20}$ | Analysis | | |
|---|---|---|---|---|---|
| | | | | C | H | N |
| 4 | 156–158°/0.05 | 1.5634 | Calcd | 86.47 | 9.15 | 4.38 |
| | | | Found | 86.82 | 9.05 | 4.85 |
| 5 | 158–162°/0.05 | 1.5661 | Calcd | 86.47 | 9.15 | 4.38 |
| | | | Found | 86.67 | 9.04 | 4.96 |
| 6 | 162–164°/0.05 | 1.5598 | Calcd | 86.43 | 9.37 | 4.20 |
| | | | Found | 86.58 | 8.99 | 3.98 |

EXAMPLE 10

*1-(1-methyl-3-pyrrolidylmethyl)-3-(p-methoxyphenyl)indene*

The 3-(p-methoxyphenyl)indene was prepared in the following manner: To an ethereal solution of 0.7 mole of p-methoxyphenyl magnesium bromide prepared from 0.7 mole p-methoxybromobenzene and 0.7 gram atom of magnesium was added 66 grams (0.5 mole) of indanone dissolved in dry benzene. After decomposing the reaction mixture with ice and hydrochloric acid, the organic layer was dried and the solvent was removed. The residue was recrystallized from Skelly F. solvent resulting in a product melting point 53–55° C., boiling point 143–150° C./0.4 mm. Using the same procedure described in Example 3, 133.2 g. (0.6 mole) of 3-(p-methoxyphenyl)indene was condensed with 53.4 grams (0.4 mole) of 1-methyl-3-pyrrolidylmethyl chloride in the presence of 17.2 grams (0.44 mole) of sodamide. The crude product was fractionated. The purified product, boiling point 172–174° C./0.1 mm., $n_D^{20}$ 1.5970 had the following analysis: Calcd. for $C_{22}H_{25}NO$: N, 4.38. Found: N, 4.55.

EXAMPLE 11

*1-(1-methyl-3-pyrrolidylmethyl)-3-(p-methoxyphenyl)indane*

In 50 ml. of 95% ethanol, 26.0 grams of 1-(1-methyl-3-pyrrolidylmethyl)-3-(p-methoxyphenyl)indene, as prepared in Example 10, was reduced in the presence of 1.5 grams of 10% palladium on charcoal. After the reduction was complete, the catalyst was removed by filtration and the filtrate distilled. The fraction boiling, 222–228° C./0.4 mm., $n_D^{20}$ 1.6254, was collected and amounted to 13.5 grams (50% yield).

*Analysis.*—Calcd. for $C_{22}H_{27}NO$: C, 82.20; H, 8.47; N, 4.36. Found: C, 81.94; H, 8.05; N, 4.60.

EXAMPLE 12

*1-(1-methyl-3-pyrrolidylmethyl)-1-methyl-3-phenylindene*

The starting material 1-methyl-3-phenylindene was prepared in the following manner: Using the procedure of Koelsch et al., Jour. Amer. Chem. Soc., 65, 59 (1943), 86 g. (1.0 mole) of crotonic acid was condensed with benzene (630 ml.) in the presence of 405 g. (3 moles) of aluminum chloride. The yield on distillation was 121.6 g. (83%), boiling point 132–137°/0.15 mm., $n_D^{20}$ 1.5560. A solution of 122 g. (0.83 mole) of 3-methyl-1-indanone in 250 ml. of dry benzene was added to a stirred solution of 335 ml. of 3 N phenylmagnesium bromide. After the addition, reflux was continued for four hours, then decomposed in the usual manner. The product, 1-methyl-3-phenylindene, was distilled and the fraction boiling, 125–131°/0.1 mm., was collected, $n_D^{20}$ 1.6192. This amounted to 136 g. (80%).

In 25 ml. of dry benzene, 5 g. (0.13 mole) of sodium amide was slurried and to this was added 25 g. (0.12 mole) of 1-methyl-3-phenylindene. After refluxing this mixture for 30 minutes, 14.5 g. of 1-methyl-3-chloromethylpyrrolidine was added and reflux was continued for 3 hours. After cooling, the reaction was decomposed on ice and hydrochloric acid, and the organic layer was separated. From the organic layer, 4.9 g. of 1-methyl-3-phenylindene was recovered. The acidic aqueous layer was made basic with 40% sodium hydroxide and extracted with ether. The ether extract was dried and distilled. The fraction boiling, 171–173°/0.05 mm. was collected and amounted to 18.6 g. (58% yield).

*Analysis.*—Calcd. for $C_{22}H_{25}N$: N, 4.62. Found: N, 4.73.

EXAMPLE 13

*1-(1-methyl-3-pyrrolidylmethyl)-1-methyl-3-phenylindane*

In 75 ml. of 95% ethanol, 13.8 g. (0.043 mole) of 1-(1-methyl-3-pyrrolidylmethyl)-1-methyl-3-phenylidene was reduced in a Parr hydrogenator in the presence of 0.8 g. of 10% palladium on carbon. After the catalyst was removed by filtration, the solvent was stripped and the residue distilled. The main fraction amounted to 10.8 g. (80% yield), boiling point 158–160°/0.05 mm., $n_D^{20}$ 1.5704. The infrared spectrum was consistent with the assigned structure.

*Analysis.*—Calcd. for $C_{22}H_{27}N$: N, 4.58. Found: N, 4.70. The hydrochloride salt had a melting point of 172–173° C.

*Analysis.*—Calcd. for $C_{22}H_{27}N \cdot HCl$: C, 77.22; H, 8.26; N, 4.12; Cl, 10.43. Found: C, 77.30; H, 8.33; N, 4.36; Cl, 10.07.

As indicated above, the acid addition and quaternary ammonium salts of these compounds may be readily prepared by accepted and well known means. The following examples will illustrate the preparation of some specific salts:

EXAMPLE 14

*1-(1-methyl-3-pyrrolidylmethyl)-3-phenylindane hydrochloride*

In 700 ml. of anhydrous ether, 23.0 g. (0.08 mole) of 1-(1-methyl-3-pyrrolidylmethyl)-3-phenylindane, was dissolved. To the solution was added gaseous hydrogen chloride until no more precipitate came down. After cooling, the ether was decanted from the precipitated hydrochloride and the precipitate recrystallized from 120 ml. of butanone-2. After three recrystallizations from butanone-2 and two from ethylacetate, 1.0 g. (4% yield) of pure hydrochloride (A isomer) was obtained, M.P. 134–136°. Another product (B isomer) melting at 197–198° was similarly prepared.

In this example it will be noted that two products having different melting points are produced. This is accounted for on the basis of the diasterioisomers which are possible on the basis of asymmetric carbon atoms in the structure. Isomers have also been observed in the case of the salts of the other compounds herein disclosed.

EXAMPLE 15

*1-(1-methyl-3-pyrrolidylmethyl)-3-phenylindane mucate*

In 160 ml. of absolute methanol 22 g. of the 1-(1-methyl-3-pyrrolidylmethyl)-3-phenylindane was dissolved. A slight excess of mucic acid was added (7.95 g.) and the mixture was warmed until no more acid went into solution. The slight excess of acid was removed by filtration. The filtrate was evaporated to dryness; the last trace of solvent was removed under high vacuum. The residue was powdered, 29.7 g. (99% yield) melting point 100–102°.

*Analysis.*—Calcd. C, 72.70; H, 7.63; N, 3.53. Found: C, 72.04; H, 7.78; N, 3.45.

EXAMPLE 16

*1-(1-methyl-3-pyrrolidylmethyl)-3-phenylindene methiodide*

In 50 ml. acetonitrile 8.1 g. of 1-(1-methyl-3-pyrrolidylmethyl)-3-phenylindene was dissolved and 12.8 g. of methyliodide was added. The mixture was allowed to stand until it crystallized (nine months). Recrystallized from isopropanol gave 2.3 g., melting point 186–188°.

*Analysis.*—Calcd. C, 61.25; H, 6.08. Found: C, 60.25; H, 5.78.

Examples of other suitable nontoxic acid addition salts are hydrobromides, hydroiodides, sulfates, phosphates, acetates, citrates, succinates, tartrates and the like. Similarly, other suitable quaternary ammonium salts are those that may be obtained by the addition of the nontoxic basic ester of alkyl or aralkyl esters of inorganic acids or organic sulfonic acids, the foregoing including such compounds as methyl chloride, methyl bromide, ethyl bromide, propyl chloride, benzyl chloride, benzyl bromide, methyl sulfate, methyl benzene sulfonate, methyl paratoluene sulfonate, and the like.

This application is a continuation in part of our copending application Serial No. 626,309, filed December 5, 1956, now abandoned.

While several particular embodiments of this invention are shown above, it will be understood of course that the invention is not to be limited thereto, since many modifications may be made, and it is contemplated therefore, by the appended claims, to cover any such modifications as fall within the true spirit and scope of this invention.

We claim:

1. A compound selected from the group consisting of a compound of the structure

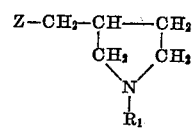

wherein $R_1$ is a radical selected from the group consisting of lower alkyl and lower alkenyl, and Z is a radical selected from the group consisting of

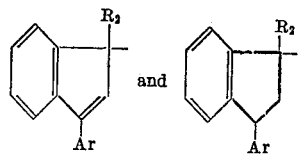

wherein $R_2$ is selected from the group consisting of hydrogen and lower alkyl and wherein Ar is selected from the group consisting of phenyl and lower alkoxy phenyl; and the nontoxic, therapeutically acceptable acid addition and lower alkyl halide quaternary ammonium salts of said compound.

2. 1-(1-methyl-3-pyrrolidylmethyl)-3-phenylindene.
3. 1-(1-methyl-3-pyrrolidylmethyl)-3-phenylindane.
4. 1-(1-methyl-3-pyrrolidylmethyl)-3-phenylindane hydrochloride.

5. 1-(1-ethyl-3-pyrrolidylmethyl)-3-phenylindene.
6. 1-(1-ethyl-3-pyrrolidylmethyl)-3-phenylindane.
7. 1-(1-lower alkyl-3-pyrrolidylmethyl)-3-phenylindene.
8. 1-(1-lower alkyl-3-pyrrolidylmethyl)-3-phenylindane.
9. 1-(1-lower alkyl-3-pyrrolidylmethyl)-1-lower alkyl-3-phenylindene.
10. 1-(1-lower alkyl-3-pyrrolidylmethyl)-1-lower alkyl-3-phenylindane.
11. 1-(1-methyl-3-pyrrolidylmethyl)-3-phenylindane mucate.
12. 1-(1-methyl-3-pyrrolidylmethyl)-3-phenylindene methiodide.

References Cited in the file of this patent
UNITED STATES PATENTS

| | | |
|---|---|---|
| 2,794,048 | Richter et al. | May 28, 1957 |
| 2,798,888 | Ueberwasser | July 9, 1957 |
| 2,916,490 | Schenck et al. | Dec. 8, 1959 |